United States Patent [19]

Greene

[11] 4,006,472
[45] Feb. 1, 1977

[54] AIRCRAFT ALTITUDE ALERTING DEVICE

[75] Inventor: Leonard M. Greene, Chappaqua, N.Y.

[73] Assignee: Safe Flight Instrument Corporation, White Plains, N.Y.

[22] Filed: May 7, 1975

[21] Appl. No.: 575,161

[52] U.S. Cl. .................... 340/181; 340/201 P; 340/266; 340/271; 73/384; 250/231 R
[51] Int. Cl.² .................................. G08B 5/36
[58] Field of Search ........... 340/181, 27 AT, 27 R, 340/27 NA, 190, 201 P, 271, 266; 250/231 R, 231 P, 231 SE, 570; 73/384, 385, 386

[56] References Cited

UNITED STATES PATENTS

| 2,113,947 | 4/1938 | Pottish | 250/231 R |
| 2,329,715 | 9/1943 | Grier | 250/231 R |
| 2,491,591 | 12/1949 | Sweeny et al. | 340/266 |
| 3,043,580 | 7/1962 | Angus | 73/384 |
| 3,513,708 | 5/1970 | Springer | 250/231 P |
| 3,633,835 | 1/1972 | Beers | 250/231 |
| 3,815,420 | 6/1974 | Springer | 73/384 |
| 3,916,185 | 10/1975 | Jehly | 250/231 SE |

Primary Examiner—John W. Caldwell
Assistant Examiner—James J. Groody
Attorney, Agent, or Firm—Edward A. Sokolski

[57] ABSTRACT

The drive for the indicator mechanism of an altimeter is connected so as to drive altitude marker means, the relative position of such marker means being indicative of altitude. The marker means has a marker which may be implemented by a slot formed therein to reference this position. Sensor means is mounted in proximity to and for movement relative to the marker means. The sensor means is manually set to a position relative to the marker means by means of an altitude alert setting device, the set position representing an altitude at which an alerting signal is desired. When the marker means is driven by the altimeter mechanism so that the marker arrives opposite the sensor means, thus indicating that the marker means and the sensor means are both at positions representing the same altitude, a signal is generated by the sensor means which is used to appropriately actuate a signal device indicating that the alerting altitude has been reached.

4 Claims, 10 Drawing Figures

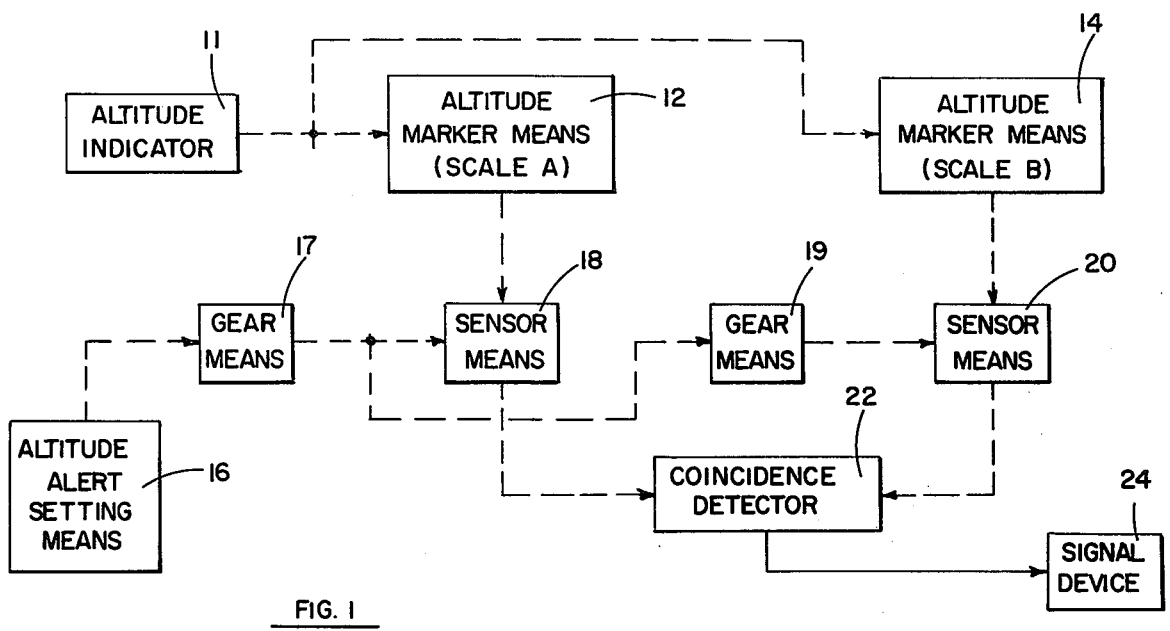
FIG. 1
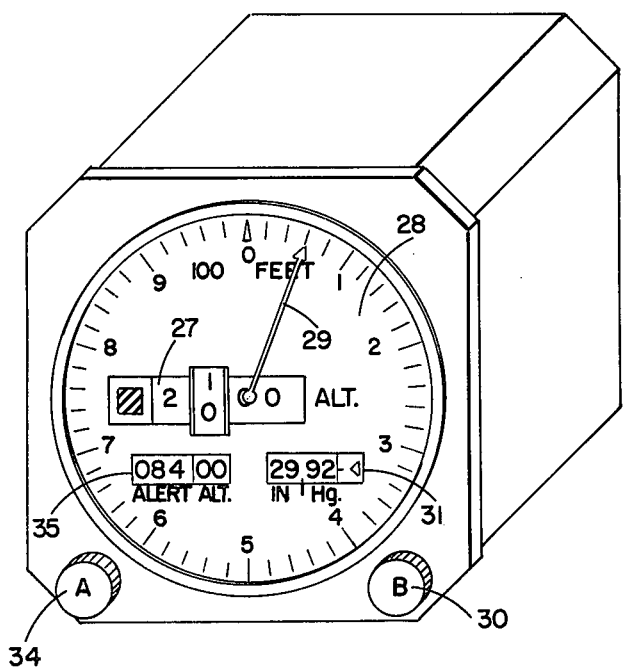
FIG. 2
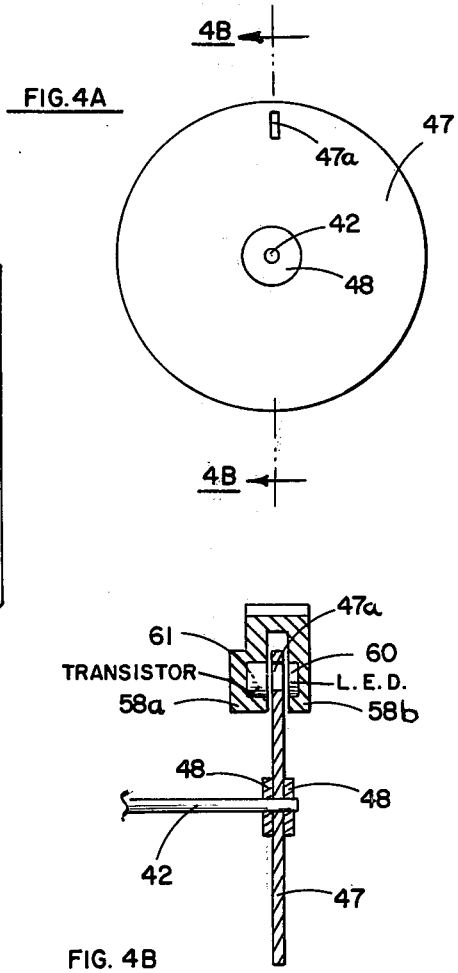
FIG. 4A
FIG. 4B

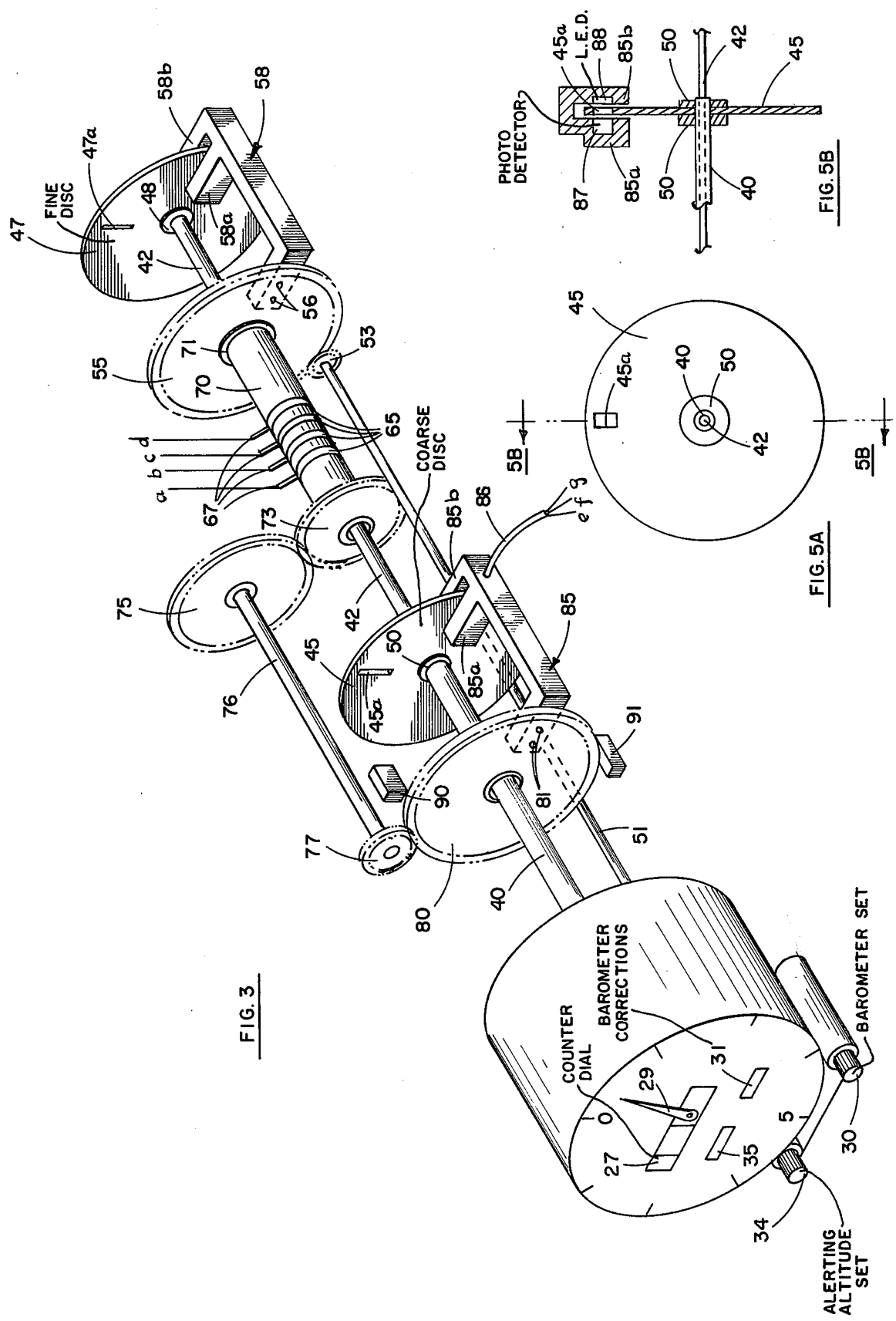

AIRCRAFT ALTITUDE ALERTING DEVICE

This invention relates to an aircraft altitude alerting device, and more particularly to such a device which is integrated with the aircraft altimeter.

In the operation of an aircraft, it is highly desirable to provide an alerting signal indicating when the aircraft has reached a particular desired altitude. Such alerting devices of the prior art are generally units separate and apart from the aircraft altimeter and may utilize a barometer or pressure transducer mechanism. This provides the altimeter reading on a different panel than that on which the altitude alert is set, contributing to error in making and reading this setting. Further, in view of the fact that accurate altitude information is available from the altimeter, the use of such a separate instrument particularly if it is one of high accuracy entails significant additional expense. Often, to minimize this expense, particularly in the case of small private aircraft, such an alerting instrument will use an altitude sensor having inherently lower accuracy than the altimeter.

The present invention provides improvement over such prior art altitude alerting devices by incorporating such a device with the altimeter as an integral part thereof. In this manner, the accurate altitude sensor of the altimeter is utilized in implementing the altitude alerting function, obviating the need for a separate such sensor for this function. Further, the altitude alerting device is packaged right along with the altimeter so as to simplify its utilization and so as to incorporate its setting and indicating units in the altimeter panel.

It is therefore an object of this invention to simplify the implementation of altitude alert signaling.

It is a further object of this invention to provide an altitude alerting device which is more economical in its implementation than prior art devices.

It is another object of this invention to provide an altitude alerting device having its setting and indicating mechanism incorporated into the regular altimeter panel to provide at a single glance both the actual altitude and the alert altitude setting.

It is still another object of this invention to facilitate the correlation of the alert altitude settings with the altimeter indication of altitude.

Other objects of this invention will become apparent as the description proceeds in connection with the accompanying drawings, of which:

FIG. 1 is a functional block diagram of the system of the invention;

FIG. 2 is a pictorial view of the panel of the preferred embodiment of the invention;

FIG. 3 is a perspective view which schematically illustrates the mechanical features of the preferred embodiment of the invention;

FIGS 4A and 4B are elevational views illustrating the altitude marker mechanism of the preferred embodiment for a first scale;

FIGS 5A and 5B illustrate the altitude marker mechanism of the preferred embodiment for a second scale;

Figure 6:
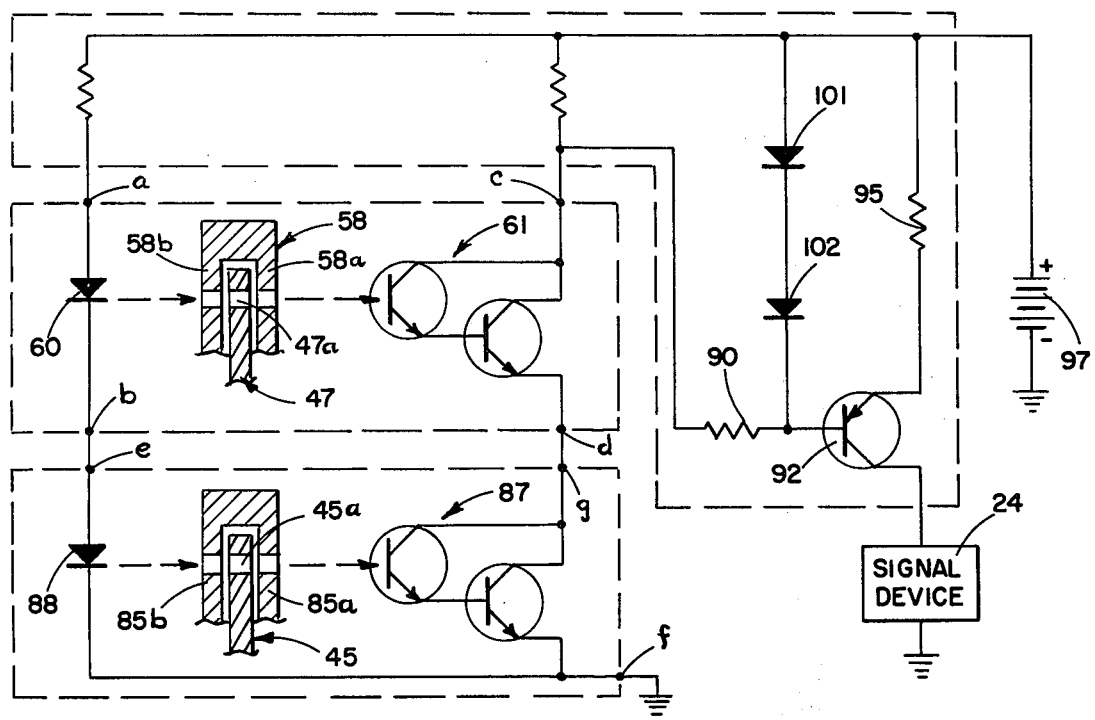
FIG. 6 is an electrical schematic drawing of the sensing and control circuits of the preferred embodiment.

Briefly described, the device of the invention is as follows: The indicator drive mechanism of an altimeter is coupled to an altitude marker device which is thereby positioned in accordance with the indicated altitude. A sensor device is mounted adjacent to the marker device and set in a predetermined position relative thereto by means of an alert setting control, this predetermined position representing an altitude at which an alerting signal is desired. When the altitude indicator indicates the altitude to which the sensor device is set, the marker and sensor devices are in positions representing the same altitude such that the sensor device senses a marker on the marker device and produces an output signal, this output signal actuating an appropriate signal device to alert the pilot. In the preferred embodiment, the marker device is implemented by means of a pair of discs each representing a different altitude scale and having radial slots formed therein to mark the altitude for which each disc is set. The sensor device is implemented by a photoelectric pickoff for each of the marker discs, each such pickoff being set to a position about the rotation axis of its associated disc by means of the altitude alert setting control. When the slots of both discs simultaneously are adjacent to their associated pickoffs, a coincidence detector is actuated which operates to drive the alerting signal device.

Referring now to FIG. 1, a functional schematic illustrating the invention is shown. A mechanical signal in accordance with the drive of the indicator mechanism of altitude indicator 11 is fed to altitude marker means 12 and altitude marker means 14. Altitude marker means 12 represents a first scale (scale A) and is driven by a first scaled output of altitude indicator 11 comprising a coarser scale (e.g., 144° rotation representing 40,000 feet of altitude), while altitude marker means 14 provides a finer scale (e.g., each rotation represents 10,000 feet of altitude).

Altitude alert setting means 16, which may comprise a control knob and a drive shaft, is coupled through gear means 17 to sensor means 18, the output of gear means 17 also being coupled through gear means 19 to sensor means 20. Sensor means 18 is positioned adjacent to altitude marker means 12, while sensor means 20 is positioned adjacent to altitude marker means 14, both sensor means being mounted for positioning relative to their associated marker means. Gear means 17 and 19 are constructed and arranged so as to enable the positioning of sensor means 18 and 20 in accordance with scale factors which are the same as those for marker means 12 and 14 respectively. Sensor means 18 and 20 are thus set in position relative to their associated marker means 12 and 14 by means of altitude alert setting means 16 so as to represent any particular altitude at which an alerting signal is desired. Altitude marker means 12 and 14 are driven by the indicator mechanism of altitude indicator 11 such that their positions at any moment represent the indicated altitude. When marker means 12 and 14 arrive respectively at positions representing the altitude positions to which sensor means 18 and 20 are set, the sensor means are both actuated by markers on their associated marker means. The simultaneous actuation of sensor means 18 and 20 is detected by coincidence detector 22, which provides a signal to actuate signal device 24. It is to be noted that, while in typical implementations, the altitude marker means and the sensor means will be rotatably driven, that it is possible to also implement the invention with linear drive of these elements. It is also to be noted that while "coarse" and "fine" scales are shown for the marker and sensor means in FIG. 1, that it is also possible to implement the invention with single altitude marker means and sensor means which are appropriately scaled to provide the desired accuracy.

Referring now to FIG. 2, the face panel of a preferred embodiment of the invention is perspectively illustrated. The device utilizes a conventional altimeter which provides altitude indications on both counter dial 27 and circular dial 28 which operates in conjunction with dial hand 29. Barometer corrections are set into the instrument by means of knob 30, this correction setting being indicated on dial 31. Knob 34 is used to set the alerting altitude, as to be explained in connection with FIG. 3, this altitude being indicated on dial 35.

Referring now to FIG. 3, a mechanical implementation of a preferred embodiment of the invention is schematically illustrated. Shaft 40 is coupled to the indicator drive mechanism of the altimeter by appropriate gearing (not shown) so that it makes one complete revolution for 100,000 feet change in indicated altitude. Shaft 42 is coupled to the indicator drive mechanism of the altimeter by appropriate gearing (not shown) so that it makes one complete revolution for each 10,000 feet change in indicated altitude. Shaft 42 is mounted in internal concentricity with shaft 40 and rotates independently thereof. Disc 45 is fixedly attached to shaft 40 and rotatably driven thereby, while disc 47 is fixedly attached to shaft 42 and rotatably driven by this shaft. As can be more easily seen in FIGS. 4A, 4B and 5A, 5B, disc 47 has a relatively narrow marker slit 45a formed radially therein, while disc 45 has a wider radial slit 45a formed therein. Shaft 42 is attached to disc 47 by means of clamping sleeves 48 while shaft 40 is attached to disc 45 by means of clamping sleeves 50.

Altitude alert setting knob 34 is connected to shaft 51, this shaft being coupled to the mechanism of alert altitude dial 35 such that one revolution of the shaft corresponds to a change of 1,000 feet on the alert altitude dial. Gear 53 is attached to one end of shaft 51, this gear engaging the geared edge of disc 55. The gear ratio between gear 53 and disc 55 is such that disc 55 makes one complete rotation for each 10 rotations of gear 53. Thus, each complete rotation of disc 55 represents 10,000 feet of altitude alert setting.

Bracket 58 is fixedly attached to disc 55 by means of bolts 56 and has a pair of arms 58a and 58b extending therefrom, these arms bracketing disc 47. As can be seen in FIG. 4B, mounted in arm 58b is light emitting diode 60 while mounted in arm 58a is photosensitive transistor assembly 61. When slit 47a arrives at a predetermined position between diode 60 and transistor assembly 61, the light emitted by diode 60 passes through the slit to actuate the photosensitive transistor assembly 61 providing an output signal therefrom. This output signal is carried from the photosensitive assembly 61 to a pair of the slip rings 65 by an appropriate cable (not shown), the signal being picked off the slip rings by fingers 67 and fed to a cable (not shown) by means of which it is carried to control circuitry which is to be explained further on in connection with FIG. 7.

Disc 55 is fixedly attached to cylindrical hollow shaft 70 by means of clamp ring 71. This shaft is made of an insulating material such as plastic or has an insulating sheath thereon, so as to provide a proper insulating substrate for slip rings 65. Gear wheel 73 is fixedly attached to shaft 70, this last mentioned gear wheel being rotatably supported by support means (not shown) for rotation about shaft 42. Gear wheel 73 drives gear wheel 75 which is coupled to gear wheel 77 by means of shaft 76. Gear wheel 77 engages the geared edge portion of disc 80, which is rotatably supported for rotation about shaft 40 by support means (not shown). The gear train formed by gear wheels 73, 75 and 77 provides a 10:1 ratio between the rotation of disc 55 and disc 80.

Bracket 85 is fixedly attached to disc 80 by means of bolts 81 and has a pair of arm portions 85a and 85b which bracket disc 45 in the same manner as for bracket 58 and disc 47. As shown in FIG. 5B, arms 85a and 85b house photosensitive transistor assembly 87 and light emitting diode 88 respectively to provide a photoelectric pickoff which generates an output signal when slot 45a arrives between this diode and transistor assembly. The output of the photoelectric pickoff is fed by means of cable 86 to the control unit for utilization, as to be described in connection with FIG. 7. Stop blocks 90 and 91 are provided to limit the travel of disc 80 to 151°, bracket 85 striking the blocks at each of the travel limits.

Figure 7:
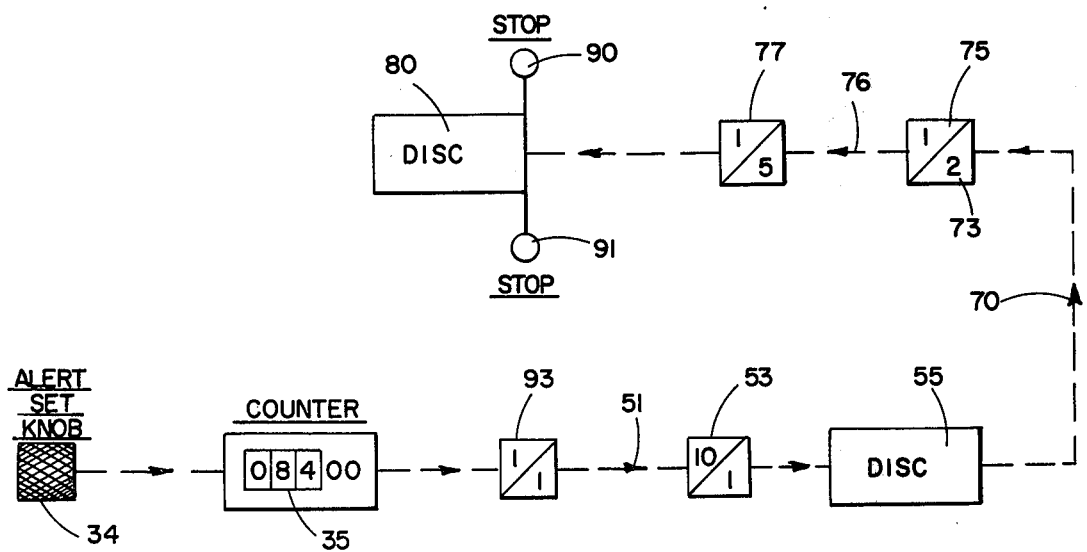
FIG. 7 is a schematic drawing illustrating the gearing arrangement of the alert setting mechanism of the preferred embodiment.

Referring now to FIG. 7, the gearing arrangement of the alerting mechanism of the preferred embodiment is schematically illustrated. Alert set knob 34 is operated manually to drive counter 35 which is coupled through 1:1 gear 93 and shaft 51 to gear 53. Gear 53 drives disc 55 in a 10:1 gear ratio. Disc 55 is coupled through shaft 70 to gear 73 which drives gear 75 in a 2:1 gear ratio. Gear 75 is coupled by means of shaft 76 to gear 77 which drives disc 80 in a 5:1 gear ratio. Stops 90 and 91 limit the rotation of disc 80 in a range representing altitudes between −1,000 feet and +41,000 feet. One rotation of knob 34 may represent a 1,000 foot change of altitude. As can be seen from FIG. 7, with such scaling, one rotation of disc 55 represents a 10,000 foot change of altitude, while one rotation of disc 80 represents a 100,000 foot change of altitude.

Referring now to FIG. 6, the electrical circuitry of the alert warning signal generating means is schematically illustrated. When the apertured portion 47a of disc 47 arrives between light emitting diode 60 and photodetector 61, the light output of the diode is passed through to the photodetector (formed by a Darlington transistor pair). It is to be noted that for convenience of illustration, the light emitting diode and the photodetector have not been shown mounted in arms 58b and 58a, as in FIG. 4B. The light signal received from the light emitting diode causes transistor pair 61 to conduct. Light emitting diode 88 operates in conjunction with disc 45 to cause photodetector pair 87 to conduct when aperture 45a is in position between arm portions 85a and 85b, in the same manner as that just described. With both apertures 45a and 47a in aligned positions between their assoicated light emitting diodes and photodetectors, such that both photo-detectors are in conduction, a potential near ground is applied through resistor 90 to the base of PNP transistor 92. This causes transistor 92 to be driven to a conductive state providing a current path from DC power source 97 to signal device 24 through resistor 95 and the transistor, thereby causing actuation of this device. Signal device 24 may comprise any suitable alerting means such as, for example, a bell, chime, light, etc. Diodes 101 and 102 and resistor 95 form a current limiting circuit for protection against overloads and short circuits.

Figure 8:
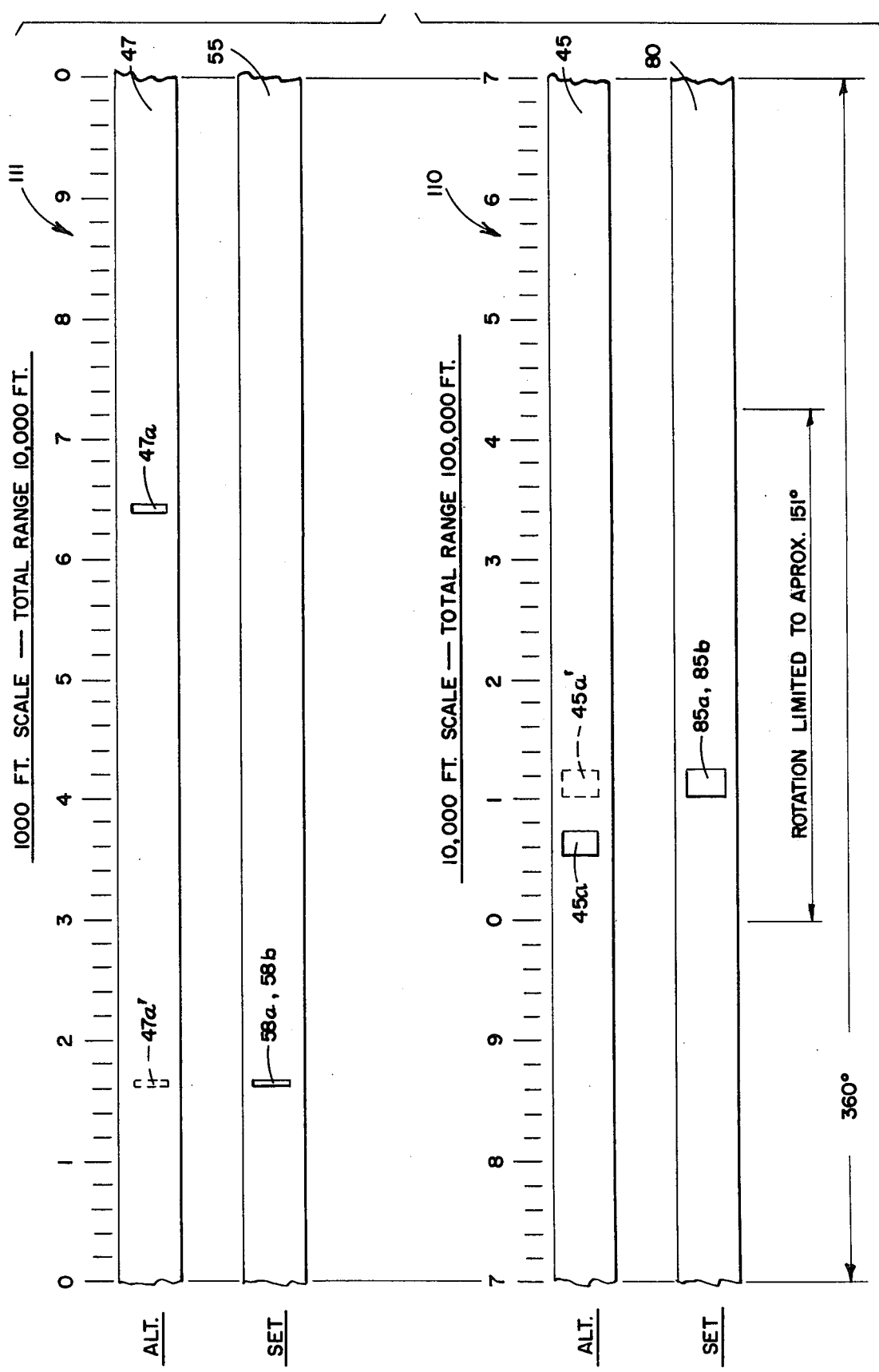
FIG. 8 is a graphic drawing illustrating the operation of the preferred embodiment.

Referring now to FIG. 8, the operation of the device of the invention is graphically illustrated. For the purposes of illustration, it is assumed that the existing altitude is 6400 feet (indicated by the positions of slots 45a and 47a relative to scales 110 and 111 respectively). It is further assumed that the alert altitude is set at 11,600 feet (indicated by the positions of sensor arms 85a, 85b and 58a, 58b relative to these same scales). As the altitude increases, discs 45 and 47 are driven by the altimeter mechanism and when the alerting altitude is reached, slots 45a and 47a will be positioned directly opposite arms 85a, 85b and 58a, 58b respectively (as indicated by dotted boxes 45a' and 47a' in FIG. 8), to cause actuation of the signal device.

The device of this invention thus provides a highly accurate yet simple altitude alerting device which is integrated with the altimeter so that it may be set and this setting indicated right at the altimeter panel.

While the invention has been described and illustrated in detail, it is to be clearly understood that this is intended by way of illustration and example only and is not to be taken by way of limitation, the spirit and scope of this invention being limited only by the terms of the following claims.

I claim:

1. An altitude alerting device mounted in an aircraft for providing a signal indicating when the aircraft has reached a predetermined alerting altitude comprising:
    means for indicating the altitude of the aircraft,
    altitude marker means mechanically driven by said altitude indicating means, said marker means comprising first and second similar discs rotatably driven by the indicating means, a radial marker being formed in each of said discs, which markers are positioned in accordance with the indicated altitude,
    first and second sensors positioned in proximity to said first and second discs respectively,
    means for rotatably supporting said sensors for positioning about the rotation axes of said first and second discs respectively,
    means for setting said sensors in positions relative to their associated discs about the rotation axes of said discs, representing said predetermined altitude,
    said first disc and sensor providing a coarse altitude scale, said second disc and sensor providing a fine altitude scale, and
    signaling means for generating an alerting signal in response to an output from said sensors.

2. The device of claim 1 wherein is included a coincidence detector for providing a signal to said signaling means when said sensors have simultaneous outputs.

3. An altitude alerting device mounted in an aircraft for providing a signal indicating when the aircraft has reached a predetermined altitude comprising:
    an altimeter having an indicator mechanism providing a mechanical signal in accordance with aircraft altitude,
    altitude marker means comprising first and second discs, each of said discs having a radial slot formed therein,
    means for supporting said discs for rotation about a predetermined axis,
    said discs being rotatably driven by said mechanical signal to position said slots about said predetermined axis in accordance with aircraft altitude,
    sensor means comprising first and second photo-electric detectors positioned proximate to said first and second discs respectively, said first and second detectors and discs representing "coarse" and "fine" altitude positions respectively,
    means for setting said photo-electric detectors in positions about said predetermined axis relative to said discs in accordance with said predetermined altitude,
    signaling means for generating said signal indicating that the aircraft has reached the predetermined altitude,
    coincidence detector means responsive to simultaneous outputs from both of said photo-electric detectors for actuating said signaling means when both said first photo-electric detector and said first disc are in corresponding positions about said axis and said second photo-electric detector and said second disc are in corresponding positions about said axis.

4. The device of claim 3 and further including stop means for limiting the range of travel of said first detector about said predetermined axis.

* * * * *